(12) United States Patent
Hagenburg et al.

(10) Patent No.: US 11,270,462 B2
(45) Date of Patent: Mar. 8, 2022

(54) CALIBRATION DEVICES AND METHODS

(71) Applicant: Motherson Innovations Company Limited, London (GB)

(72) Inventors: Kai Uwe Hagenburg, Stuttgart (DE); Martin Schwalb, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/413,373

(22) Filed: May 15, 2019

(65) Prior Publication Data

US 2019/0355151 A1 Nov. 21, 2019

(30) Foreign Application Priority Data

May 16, 2018 (DE) .................... 10 2018 111 776.0

(51) Int. Cl.
| | | |
|---|---|---|
| *H04N 17/00* | (2006.01) | |
| *G06T 7/80* | (2017.01) | |
| *H04N 5/247* | (2006.01) | |
| *G06T 7/70* | (2017.01) | |
| *G06T 7/00* | (2017.01) | |
| *B60R 11/04* | (2006.01) | |

(52) U.S. Cl.
CPC .............. *G06T 7/80* (2017.01); *G06T 7/70* (2017.01); *H04N 5/247* (2013.01); *H04N 17/002* (2013.01); *B60R 11/04* (2013.01); *B60Y 2200/148* (2013.01); *G06T 7/001* (2013.01); *G06T 2207/30204* (2013.01); *G06T 2207/30244* (2013.01); *G06T 2207/30252* (2013.01)

(58) Field of Classification Search
CPC ... G06T 7/80; G06T 7/70; G06T 2207/30244; G06T 2207/30252; G06T 7/001; G06T 2207/30204; H04N 17/002; H04N 5/247; B60Y 2200/148; B60R 11/04; B60R 2300/402; B60R 1/00
USPC ........................................................ 348/148
See application file for complete search history.

(56) References Cited

U.S. PATENT DOCUMENTS

| | | | |
|---|---|---|---|
| 9,933,515 B2 | 4/2018 | Prokhorov | |
| 2002/0189115 A1* | 12/2002 | Jackson | ............... G01B 11/002 33/286 |
| 2008/0036857 A1 | 2/2008 | Shimazaki | |

(Continued)

FOREIGN PATENT DOCUMENTS

| | | | |
|---|---|---|---|
| DE | 102004056669 A1 | 4/2006 | |
| DE | 102009001742 A1 | 9/2010 | |

(Continued)

OTHER PUBLICATIONS

German Office Action dated Dec. 3, 2018 of application DE 10 2018 111 776.0.

*Primary Examiner* — Michael Lee
(74) *Attorney, Agent, or Firm* — Jones Day (57) ABSTRACT

A calibration device for calibrating at least one camera system of a motor vehicle includes at least one calibration element having at least one carrier element and at least one marker element, where the marker element is or can be arranged on the carrier element and at least one connecting element, where the calibration element is or can be arranged on the motor vehicle using the connecting element. A motor vehicle and methods of using the calibration device are also described.

10 Claims, 3 Drawing Sheets

(56) References Cited

U.S. PATENT DOCUMENTS

| | | | | |
|---|---|---|---|---|
| 2010/0194886 | A1* | 8/2010 | Asari | G06T 7/85 |
| | | | | 348/148 |
| 2013/0208121 | A1* | 8/2013 | Wu | H04N 17/002 |
| | | | | 348/149 |
| 2013/0325252 | A1* | 12/2013 | Schommer | G01S 7/52004 |
| | | | | 701/33.1 |
| 2014/0184814 | A1* | 7/2014 | Lin | G06T 7/80 |
| | | | | 348/187 |
| 2015/0097948 | A1* | 4/2015 | Bostrom | G06T 7/80 |
| | | | | 348/137 |
| 2016/0236619 | A1* | 8/2016 | Tanaka | H04N 7/181 |
| 2016/0275683 | A1* | 9/2016 | Sakano | B60R 1/00 |
| 2017/0016716 | A1* | 1/2017 | Fiess | G01B 11/2755 |
| 2017/0332052 | A1* | 11/2017 | Lu | G06T 7/33 |
| 2019/0204427 | A1* | 7/2019 | Abari | G01S 17/931 |
| 2020/0128234 | A1* | 4/2020 | Varszegi | F16C 11/106 |
| 2020/0175791 | A1* | 6/2020 | Kim | G01S 7/4052 |
| 2020/0320739 | A1* | 10/2020 | Kunert | G06T 7/60 |

FOREIGN PATENT DOCUMENTS

| | | |
|---|---|---|
| DE | 102009028606 A1 | 2/2011 |
| EP | 1094668 B1 | 6/2014 |

\* cited by examiner

CALIBRATION DEVICES AND METHODS

CROSS-REFERENCE TO RELATED APPLICATION

This application claims the benefit of foreign priority to German Patent Application No. DE 10 2018 111 776.0, filed May 16, 2018, which is hereby incorporated by reference in its entirety for all purposes.

BACKGROUND

1. Field of the Invention

The present disclosure relates to a calibration device for calibrating a camera system of a motor vehicle, a method for determining calibration data for the camera system and a device for implementing this method. The present disclosure also relates to a motor vehicle including the camera system and the device, and methods of using same.

2. Description of Related Art

Today, in motor vehicles, driver assistance systems with camera systems and camera systems that replace mirrors are increasingly being used which make use of data from a plurality of cameras included in a motor vehicle. With the individual cameras, interior and surrounding areas of the motor vehicle can be captured and the image data thus obtained can be linked and evaluated in order to be able to provide the driver with further information on the basis of the image data. For this purpose, however, it is necessary, that the cameras used are calibrated such that the image data captured by the cameras can be correctly combined and reliably evaluated.

For this reason, such camera systems run through a corresponding calibration process on the production line. However, during the course of the further life cycle of the motor vehicle, in workshops, for example during systems maintenance or repair measures, these are then re-calibrated.

With known approaches, however, it is necessary in order to implement calibration that the standard elements used for the calibration are measured with regard to their position and orientation in a manner which is frequently complex. For this purpose, the use of further sensors and a plurality of manual interventions is in turn necessary. Accordingly, this leads to a complex procedure, which is not only error-prone as a result, but which is in particular also time-intensive and therefore costly.

SUMMARY

In one aspect, a calibration device for calibrating at least one camera system of a motor vehicle includes at least one calibration element having at least one carrier element and at least one marker element, where the marker element is or can be arranged on the carrier element, and at least one connecting element, wherein the calibration element is or can be arranged on the motor vehicle by means of the connecting element.

In certain examples, (i) the marker element is arranged at a distance from the outer contour of the motor vehicle by means of the carrier element; (ii) the carrier element includes a multiplicity of carrier element sections that are in particular cylindrically formed at least in sections, said carrier element sections being preferably interconnected by means of at least one marker element and/or are kept at a distance from each other; (iii) at least two, preferably more than two, in particular four and/or all carrier element sections are interconnected and/or kept at a distance from each other by a shared marker element; (iv) the marker element has a spherical outer surface at least in sections, is planar and/or plate-shaped at least in some areas and/or has a checkerboard pattern at least in some areas, in particular on at least one surface of the marker element; (v) the connecting element is planar and/or plate-shaped, a plurality of calibration elements is arranged on the connecting element and/or the calibration elements and/or the carrier elements are arranged on the connecting element parallel to each other, along a straight line and/or along a curved section, in particular a circular curved section; and/or (vi) the marker element is identifiable and/or distinguishable from the carrier element on a recording, in particular a camera image, captured by a sensor, in particular an optical sensor, through evaluation of the recording with reference to the shape, pattern and/or color.

In certain examples, (i) the calibration device is arrangeable by means of the connecting element on at least one wheel of the motor vehicle, in particular along the extension direction of at least one wheel axis of the motor vehicle; (ii) the calibration device is arrangeable by means of the connecting element on at least one section of the chassis of the motor vehicle and/or the connecting element, in particular its circumferential shape, is formed such that in order to be able to interact, in particular in a force- and/or form-fit manner, with a structure, in particular at least one boundary at least in sections, of the section, preferably, the connecting element has a structure and/or shape that is complementary to the structure and/or contour of the motor vehicle; (iii) the connecting element enables an arrangement of the calibration device on the motor vehicle by means of plugging, screwing and/or at least one magnet included in the connecting element; and/or (iv) the calibration device comprises at least one holding area to hold at least one sensor for determining the distance between the calibration device and another object, in particular an additional calibration device and/or includes at least one spirit level for aligning the calibration device during assembly.

In another aspect, a method for determining calibration data for at least one camera system of a motor vehicle includes: recording at least one first camera image capturing at least one part of at least one first and/or second calibration device by means of at least one first sensor element having at least one first field of view; recording at least one second camera image capturing at least one part of the first and/or second calibration device by means of at least one second sensor element having at least one second field of view; identifying the first and/or second calibration device or a part thereof in the first camera image and determining first first data in relation to the first sensor element; identifying the first and/or second calibration device or a part thereof in the second camera image and determining second first data in relation to the second sensor element; determining calibration data for the first sensor element and/or the second sensor element by combining, evaluating and/or processing at least the first first data, the second first data, second data in relation to the motor vehicle and/or additional data derived from the first data and/or second data.

In certain examples, (i) the first and/or second calibration device includes a calibration device according to the first aspect of the invention; (ii) the first and/or second calibration device is or are part of the motor vehicle or is or are arranged on said motor vehicle; (iii) the first calibration device is arranged on at least one first section of the chassis of the motor vehicle and/or on at least one first wheel of the motor vehicle, in particular along the extension direction of at least one first wheel axis of the motor vehicle; (iv) the second calibration device is arranged on at least one second section of the chassis of the motor vehicle and/or on at least one second wheel of the motor vehicle, in particular along the extension direction of at least one second wheel axis of the motor vehicle; (v) the first sensor element includes at least one camera and/or is part of the motor vehicle and/or is arranged on said motor vehicle; (vi) the second sensor element includes at least one camera and/or is part of the motor vehicle and/or is arranged on said motor vehicle, and/or (vii) the first field of view and the second field of view overlap with each other at least partially.

In certain examples, (i) the identification of the first and/or second calibration device or of a part thereof is conducted in the first camera image by means of the identification of at least one marker element part of the first or second calibration device, wherein preferably, the marker element is identifiable and/or distinguishable through evaluation of the first camera image with reference to the shape, pattern and/or color; (ii) the identification of the first and/or second calibration device or of a part thereof is conducted in the second camera image by means of the identification of at least one marker element part of the first or second calibration device, wherein preferably, the marker element is identifiable and/or distinguishable through evaluation of the second camera image with reference to the shape, pattern and/or color; (iii) the determination of first first data in relation to the first sensor element includes (a) an evaluation of the first and/or second calibration devices identified in the first camera image, in particular by means of an evaluation of the perspective under which the first and/or second calibration device is shown in the first camera image, (b) the inclusion of the previously known first field of view, (c) the inclusion of at least one previously known spatial arrangement, position, orientation and/or spatial extension of the first sensor element relative to the motor vehicle, (d) the inclusion of at least one previously known spatial arrangement, position, orientation and/or spatial extension of the first and/or second calibration device relative to the motor vehicle, and/or (e) the inclusion of the second data and/or the additional data; (iv) the determination of second first data in relation to the second sensor element includes (a) an evaluation of the first and/or second calibration devices identified in the second camera image, in particular by means of an evaluation of the perspective under which the first and/or second calibration device is shown in the second camera image, (b) the inclusion of the previously known second field of view, (c) the inclusion of at least one previously known spatial arrangement, position, orientation and/or spatial extension of the second sensor element relative to the motor vehicle, (d) the inclusion of at least one previously known spatial arrangement, position, orientation and/or spatial extension of the first and/or second calibration device relative to the motor vehicle, and/or (e) the inclusion of the second data and/or the additional data; (v) the determination of calibration data includes (a) the inclusion of at least one distance, in particular determined by means of a sensor for determining the distance, between the first and second calibration device, (b) the transfer of the first first data and the second first data, in particular including the second data and/or the additional data, into a shared coordinate system, in particular a coordinate system of the motor vehicle, of the first sensor element and/or of the second sensor element, (c) the inclusion of the previously known first and/or second field of view, (d) the inclusion of at least one previously known spatial arrangement, position, orientation and/or spatial extension of the first and/or second sensor element relative to the motor vehicle, and/or (e) the inclusion of at least one previously known spatial arrangement, position, orientation and/or spatial extension of the first and/or second calibration device relative to the motor vehicle; and/or (vi) the determination of calibration data further provides information regarding at least one distance between the first and second sensor element and/or regarding at least one spatial arrangement, position, orientation and/or spatial extension of the first and/or second calibration device relative to the motor vehicle.

In certain examples, (i) the first first data includes information (a) on the first and/or second calibration devices identified in the first camera image, in particular the perspective under which the first and/or second calibration device is shown in the first camera image, (b) on the first field of view, and/or (c) on at least one spatial arrangement, position, orientation and/or spatial extension of the first sensor element, in particular in a coordinate system of the first sensor element and/or of the motor vehicle; (ii) the second first data includes information (a) on the first and/or second calibration devices identified in the second camera image, in particular the perspective under which the first and/or second calibration device is shown in the second camera image, (b) on the second field of view, and/or (c) on at least one spatial arrangement, position, orientation and/or spatial extension of the second sensor element, in particular in a coordinate system of the first sensor element and/or of the motor vehicle; and/or (iii) the second data is (a) predefined and/or stored and/or (b) includes CAD data of at least a part of the motor vehicle, the first calibration device, the second calibration device and/or the motor vehicle with first and/or second calibration devices arranged thereon, in particular at predefined positions, wherein preferably, the CAD data includes the spatial course and/or extension of the chassis, in particular the first and/or second section and/or their boundary, and/or the first and second calibration device.

In another aspect, a device for determining calibration data for at least one camera system of a motor vehicle includes at least one processor unit which is configured to implement the steps of the method.

In another aspect, a motor vehicle includes (i) at least one camera system, having at least one first sensor element and at least one second sensor element, and (ii) at least one device according to the third aspect of the invention for determining calibration data for the camera system.

The motor vehicle may be designed as a utility vehicle, a truck, a semi-trailer truck, a traction unit and/or a road vehicle.

In another aspect, a use of a calibration device according to the first aspect with a method according to the second aspect, together with a device according to the third aspect and/or on or together with a motor vehicle according to the fourth aspect.

Calibration data for the first and second sensor element can be easily and yet reliably determined by arranging one or more calibration devices on predetermined and defined positions on the motor vehicle and then identifying and evaluating the calibration devices in the camera images recorded by the sensor elements and combining the first data thus obtained with, in particular previously defined and thus known, second data of the motor vehicle and/or the calibration devices, in particular reference data of a corresponding CAD model.

Calibration devices may be well suited for determining calibration data having a connecting element which can be arranged reliably and easily in a precisely defined manner on already existing structures of the chassis. In particular, existing contours and structures of the motor vehicle are used in order to achieve a defined alignment and position of the calibration device through form-fit attachment. In particular, the contour or shape of the calibration device is designed to be complimentary to the contour or structure of the motor vehicle in the attachment area in order to achieve a defined orientation of the calibration. Incorrect orientations or incorrect positionings of the calibration device on the vehicle during assembly are thus avoided. Accordingly, it has been found to be particularly advantageous when, for example, a circumferential shape of the connecting element is complementarily formed such that it can interact at least in sections in a form-fit manner with a corresponding structure such as a boundary of a section of the chassis of the motor vehicle. When, for example, the chassis has a section with an L-shaped boundary and/or structure, a plate-shaped rectangular connecting element can very easily be arranged on the horizontally and vertically running areas of the L-shaped boundary or structure, and thus the calibration device can be positioned without a problem in a precisely defined manner and avoiding incorrect orientations or incorrect alignments, in particular according to stored second data.

Calibration data can be determined not only with calibration devices arranged on the chassis, but that calibration devices arranged on the wheels are also particularly well suited to this purpose. Thus, with the calibration devices arranged on the wheels, an extension, as it were, of the respective wheel axis can be achieved and this information can be very advantageously used when determining the first data and/or the calibration data.

In each of the cases, it can therefore be said that characteristic properties of the motor vehicle (such as the design of the chassis, the course of the direction of the wheel axis) do not only serve for the secure and predictable arrangement of the calibration devices, but conversely, a calibration device identified in a camera image also allows conclusions to be made regarding these very characteristic properties of the motor vehicle. Thus, on the basis of a recording with a captured first and/or second calibration device, in turn together with the second data, in particular CAD data, conclusions can be drawn regarding the respective sensor element that recorded the recording, and thus calibration data can be determined.

In particular, the distances between the two sensor elements and the positions of the sensor elements in relation to the motor vehicle can thus be determined, and preferably, further calibration data can be derived from this.

The positions on which the sensor elements are arranged on the motor vehicle and/or the fields of view of the sensor elements are already known and therefore this information can be used in the calibration method, the calibration data can even be determined with just one calibration device, or that in such cases, the captured part of the calibration devices in the camera images can be reduced without negatively affecting the determination of calibration data as a result.

Calibration devices can also be very easily and securely arranged on the motor vehicle in unclear situations such as on a production line or in workshops. Thus, correct calibration data can reliably be determined, which significantly increases safety.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

Figure 1:
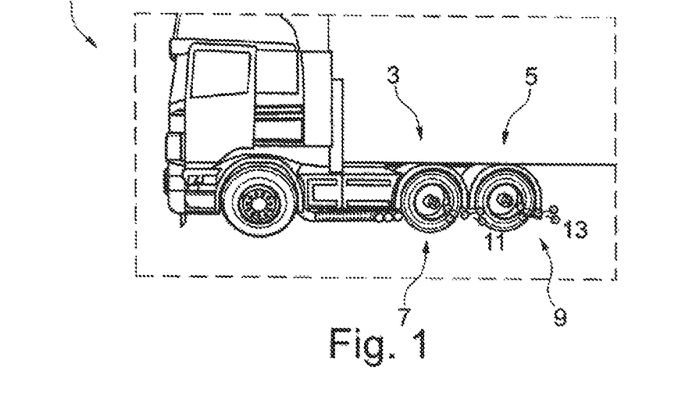
FIG. 1 shows an example of motor vehicle in a first situation with a first and second calibration device arranged on its first and second wheel.

FIG. 1 shows a motor vehicle 1, in particular a traction unit, in a first situation with a first calibration device 7 or a second calibration device 9 arranged on its first wheel 3 and second wheel 5. The two calibration devices 7, 9 correspond to a calibration device according to the first aspect of the invention. The first and second calibration device 7, 9 are arranged on the first or second wheel 3, 5 such that the main extension direction of the calibration devices 7, 9, which are designed essentially as cross-shaped, runs along the extension direction of the first or second wheel axis 11, 13 of the motor vehicle 1.

Part of the motor vehicle 1 and arranged thereon are a first sensor element (not shown in FIG. 1), in particular in the form of a first camera, and a second sensor element (also not shown in FIG. 1), in particular in the form of a second camera.

Figure 2:
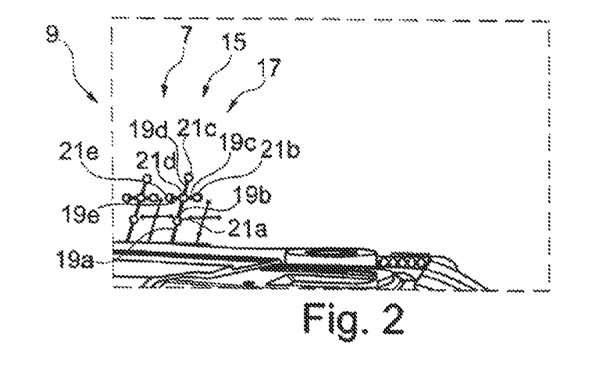
FIG. 2 shows an example of a first camera image recorded by a first sensor element with captured first and second calibration device in the first situation.

FIG. 2 shows a first camera image that has been recorded using the first sensor element. The first sensor element has a first field of view that essentially corresponds to a view from above onto the left-hand side area of the motor vehicle 1 (seen from the forwards driving direction). Both the first calibration device 7 and the second calibration device 9 are captured by the first field of view.

As can be seen in FIG. 2, the first calibration device 7 includes a calibration element 15, which has a carrier element 17. For its part, the carrier element 17 includes a multiplicity of cylindrically configured carrier element sections 19a-19e. Additionally, the calibration element 15 includes five marker elements 21a-21e. The marker elements 21a-21e are arranged on the carrier element 17. In particular, the marker element 21a serves to connect the carrier element section 19a with the carrier element section 19b. By means of the shared marker element 21d, the four carrier element sections 19b, 19c, 19d and 19e are interconnected. On the ends of the carrier element sections 19c, 19d and 19e that are not connected to the marker element 21d, marker elements 21b, 21c, 21e are arranged.

The calibration device 7 includes a connecting element (not shown in FIG. 2) with which the calibration element 15 can be arranged via a plug-in connection on the wheel 3 of the motor vehicle, such that it is an extension, as it were, of the wheel axis.

In FIG. 2, the second calibration device 9 is designed entirely according to the first calibration device 7, and therefore does not need to be explained again.

Figure 3:
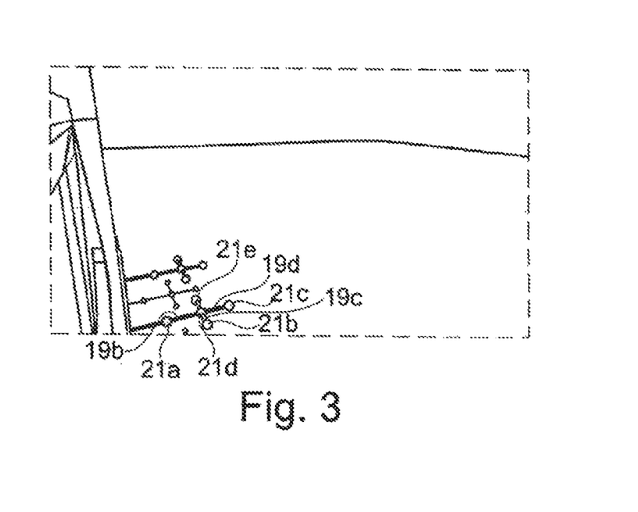
FIG. 3 shows an example of a second camera image recorded by a second sensor element with captured first and second calibration device in the first situation.

FIG. 3 shows a second camera image that has been recorded using the second sensor element. The second sensor element has a second field of view that essentially corresponds to a view from the left-hand side (in relation to the forwards driving direction) above at the front towards the rear. Even when the first field of view and the second field of view overlap, they are not identical. Even so, both the first calibration device 7 and the second calibration device 9 are captured by the second field of view. Naturally, the first and second calibration device 7, 9 are shown from different perspectives in the first and second camera image.

Figure 4:
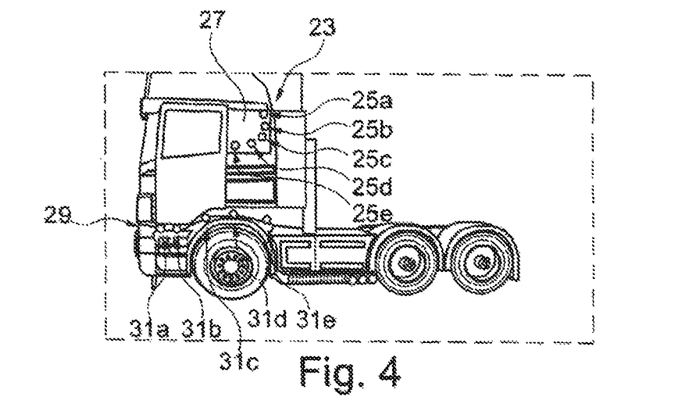
FIG. 4 shows an example of a motor vehicle in a second situation with a first and second calibration device arranged on its chassis.

FIG. 4 shows the motor vehicle 1 in a second situation with a first calibration device 23 arranged on a first section of the chassis of the motor vehicle 1. The first calibration device 23 includes five calibration elements 25a-25e, which are arranged on a connecting element 27 along a curved section. The connecting element 27 includes at least one magnet, in particular a magnetic area section, on its side facing away from the observer in FIG. 4, whereby the first calibration device 23 can be arranged on the first section by means of the connecting element 27.

The connecting element 27 is formed such that it can interact with the first section of the chassis of the motor vehicle 1. In particular, the circumferential shape of the connecting element 27 corresponds to an already existing structure of the chassis in the area of the first section. The connecting element 27 can therefore be arranged directly on the complementary structure of the chassis of the motor vehicle with at least a part of its circumferential shape. Here, the first section consists of an at least essentially rectangular indentation of the chassis, so that the also at least essentially complementarily rectangularly designed connecting element can be arranged exactly within the indentation. Thus, it is ensured that the risk of an incorrect arrangement of the first calibration device 23 by a user is excluded, since there is only one possible position how the first calibration device 23 can be arranged on the chassis, for example on the boundary of the first section.

On a second section of the chassis of the motor vehicle 1, a second calibration device 29 is further arranged, which in particular includes the calibration elements 31a-31e.

Figure 5:
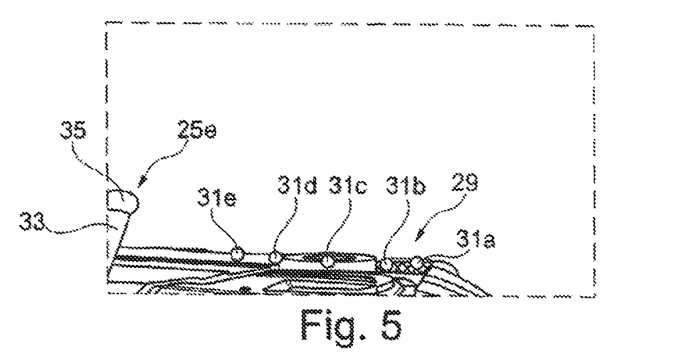
FIG. 5 shows an example of a first camera image recorded by a first sensor element with captured first and second calibration device in the second situation.

FIG. 5 shows the first camera image that has been recorded using the first sensor element. The calibration element 25e of the first calibration device 23 and at least the marker elements of the second calibration device 29 are largely captured by the first field of view.

As can be seen from FIG. 5, the calibration element 25e (like all the other calibration elements of the first and second calibration device 23, 29, shown incompletely or not at all in FIG. 5) includes a single carrier element 33. The carrier element 33 is arranged with its one end on the connecting element 27. A marker element 35 is arranged on the other end of the carrier element 33.

Figure 6:
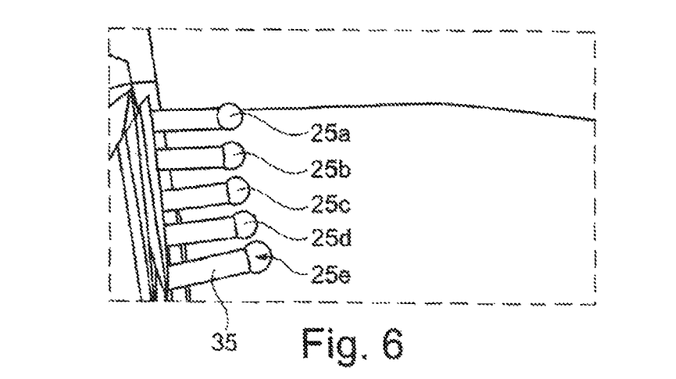
FIG. 6 shows an example of a second camera image recorded by a second sensor element with captured first calibration device in the second situation.

FIG. 6 shows a second camera image that has been recorded using the second sensor element. Only the first calibration device 23 is captured by the second field of view, but not the second calibration device 29.

Figure 7:
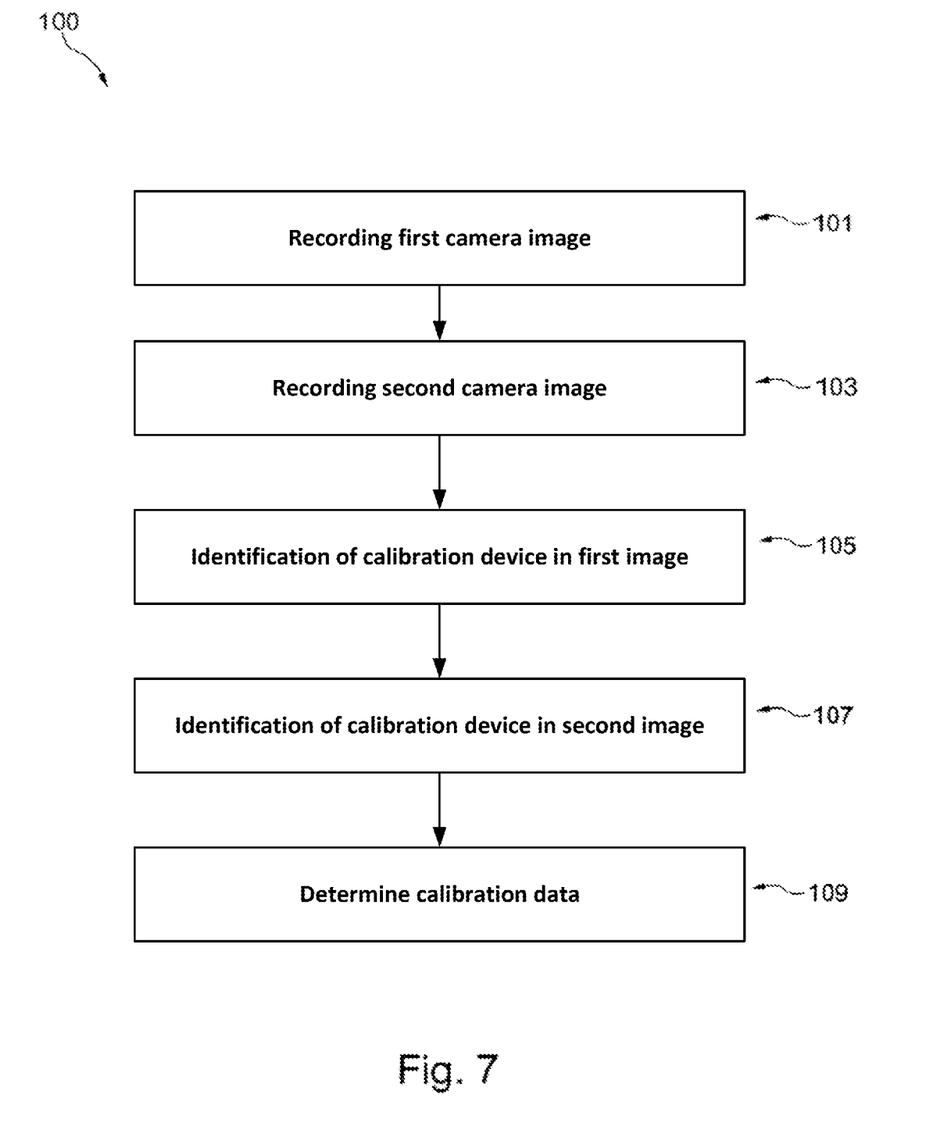
FIG. 7 shows a flow diagram of an example of a method for calibration.

FIG. 7 shows a flow diagram 100 including steps of a method according to the second aspect of the invention.

In a step 101, a first camera image is recorded using a first sensor element having a first field of view, wherein at least a part of at least one first and/or second calibration device is captured. In the first situation (FIG. 2), both calibration devices 7, 9 are captured in full. In the second situation (FIG. 5), the first and second calibration device 23, 29 is only partially captured. More precisely, only the calibration element 25e of the first calibration device 23 and essentially only the five marker elements of the second calibration device 29 are captured.

In a step 103, a second camera image is recorded using a second sensor element having a second field of view, wherein at least a part of at least the first and/or second calibration device is captured. In the first situation (FIG. 3), both calibration devices 7, 9 are captured in full. In the second situation (FIG. 6), the first calibration device 23 is fully captured and the second calibration device 29 is not captured at all.

In a step 105, in the first camera image, the first and second calibration device 7, 9, 23, 29 (or at least a part thereof, unless the whole calibration device is captured by the first camera image) are identified and first first data is determined in relation to the first sensor element. For this purpose, the marker elements of the calibration devices are identified in the first camera image, which is possible in a particularly advantageous manner, since the spherical marker elements of the calibration devices 7, 9, 23, 29 used can be very well identified and distinguished on the basis of their shape and color, in particular, they can be distinguished from the other elements of the calibration device 7, 9, 23, 29 and from the motor vehicle 1. Furthermore, the calibration devices 7, 9, 23, 29 can thus also be particularly reliably distinguished from their own shadows, as can in particular be seen in the camera images shown in FIGS. 2 and 3.

The first data is then determined in particular by an evaluation of the perspective under which the first and/or second calibration device is shown in the first camera image. This means that, depending on how the first and/or second calibration device appears in the first camera image, the viewing angle and/or the first field of view of the first sensor element can be determined. For this purpose, in particular second data is included, which includes CAD data from the motor vehicle with first and second calibration devices arranged thereon.

In a step 107, in the second camera image, the first and second calibration device 7, 9, 23, 29 (or at least a part thereof, unless the whole calibration device is captured by the second camera image) are identified and second first data is determined in relation to the second sensor element. Since this proceeds in the same manner as step 105, reference can be made accordingly to the explanations provided above.

In a step 109, calibration data is determined for the first sensor element and/or the second sensor element. Here, this is achieved by combining, evaluating and/or processing at least the first first data and the second first data and the second data.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE NUMERALS

1 Motor vehicle
3 Wheel
5 Wheel
7 Calibration device
9 Calibration device
11 Axis
13 Axis
15 Calibration element
17 Carrier element
19a-19e Carrier element section
21a-21e Marker element
23 Calibration device
25a-25e Calibration element
27 Connecting element
29 Calibration device
31a-31e Calibration element
33 Carrier element
35 Marker element
100 Flow diagram
101, 103, 105, 107, 109 Steps

What is claimed is:

1. A calibration device for calibrating at least one camera system of a motor vehicle, comprising:
   at least one calibration element having at least one carrier element and at least one marker element, wherein the marker element is arranged on the carrier element; and
   at least one connecting element, wherein the calibration element is arranged on the motor vehicle using the connecting element;
   wherein the calibration device is configured to be used with the motor vehicle or a device for determining calibration data of the camera system to perform a method comprising:
      recording at least one first camera image capturing at least one part of at least one first and/or second calibration device using at least one first sensor element having at least one first field of view;
      recording at least one second camera image capturing at least one part of the first and/or second calibration device using at least one second sensor element having at least one second field of view;
      identifying the first and/or second calibration device or a part thereof in the first camera image and determining first first data in relation to the first sensor element;
      identifying the first and/or second calibration device or a part thereof in the second camera image and determining second first data in relation to the second sensor element; and
      determining calibration data for the first sensor element and/or the second sensor element by combining, evaluating and/or processing at least the first first data, the second first data, second data in relation to the motor vehicle and/or additional data derived from the first data and/or the second data,
   wherein the first and/or second sensor element is part of the motor vehicle, and the first field of view and the second field of view overlap with each other at least partially.

2. The calibration device according to claim 1, wherein at least one of:
   the marker element is arranged at a distance from an outer contour of the motor vehicle using the carrier element,
   the carrier element comprises carrier element sections that are cylindrically formed at least in sections, the carrier element sections being interconnected using least one marker element and/or are kept at a distance from each other,
   at least two carrier element sections are interconnected and/or kept at a distance from each other by a shared marker element,
   the marker element comprises a spherical outer surface at least in sections, is planar, is plate-shaped at least in some areas, and/or has a checkerboard pattern at least in some areas,
   the connecting element is planar and/or plate-shaped, a plurality of calibration elements are arranged on the connecting element or the calibration elements, and/or the carrier elements are arranged on the connecting element parallel to each other, along a straight line, and/or along a curved section, and
   the marker element is identifiable and/or distinguishable from the carrier element on a recording captured by a sensor through evaluation of the recording with reference to the shape, pattern and/or color distinguished.

3. The calibration device according to claim 1, wherein at least one of:
- the calibration device is configured to be arranged using the connecting element on at least one wheel of the motor vehicle and along an extension direction of at least one wheel axis of the motor vehicle,
- the calibration device is configured to be arranged using the connecting element on at least one section of the chassis of the motor vehicle and/or the connecting element, and is formed to interact with at least one boundary at least in sections, the connecting element having a structure or shape that is complementary to a structure or contour of the motor vehicle;
- the connecting element enables an arrangement of the calibration device on the motor vehicle by plugging, screwing and/or at least one of the magnets part of the connecting element, and
- the calibration device comprises at least one holding area to hold at least one sensor for determining a distance between the calibration device and another object or comprises at least one spirit level for aligning the calibration device while it is being mounted.

4. A method for determining calibration data for at least one camera system of a motor vehicle, comprising:
- recording at least one first camera image capturing at least one part of at least one first and/or second calibration device using at least one first sensor element having at least one first field of view, the first and/or second calibration device comprising at least one calibration element having at least one carrier element and at least one marker element, wherein the marker element is arranged on the carrier element and at least one connecting element, wherein the calibration element is arranged on the motor vehicle using the connecting element;
- recording at least one second camera image capturing at least one part of the first and/or second calibration device using at least one second sensor element having at least one second field of view;
- identifying the first and/or second calibration device or a part thereof in the first camera image and determining first first data in relation to the first sensor element;
- identifying the first and/or second calibration device or a part thereof in the second camera image and determining second first data in relation to the second sensor element; and
- determining calibration data for the first sensor element and/or the second sensor element by combining, evaluating and/or processing at least the first first data, and the second first data, along with second data relating to the motor vehicle and/or additional data derived from the first first data and/or the second first data,
- wherein the first and/or second sensor element is part of the motor vehicle, and the first field of view and the second field of view overlap with each other at least partially.

5. The method according to claim 4, wherein at least one of:
- the first and/or second calibration device comprises a calibration device according to claim 1,
- the first and/or second calibration device is or are part of the motor vehicle and/or is or are arranged on the motor vehicle,
- the first calibration device is arranged on at least a first section of the chassis of the motor vehicle and/or on at least a first wheel of the motor vehicle along an extension direction of a first wheel axis of the motor vehicle, and
- the second calibration device is arranged on at least a second section of the chassis of the motor vehicle and/or on at least a second wheel of the motor vehicle along an extension direction of a second wheel axis of the motor vehicle.

6. The method according to claim 4, wherein at least one of:
- the identification of the first and/or second calibration device or a part thereof is conducted in the first camera image using the identification of at least one marker element part of the first or second calibration device, wherein preferably, the marker element is identifiable and/or distinguishable through evaluation of the first camera image with reference to the shape, pattern and/or color,
- the identification of the first and/or second calibration device or a part thereof is conducted in the second camera image using the identification of at least one marker element part of the first or second calibration device, wherein the marker element is identifiable and/or distinguishable through evaluation of the second camera image with reference to the shape, pattern and/or color;
- the determination of the first first data in relation to the first sensor element comprises
  - evaluating the first and/or second calibration devices identified in the first camera image using an evaluation of the perspective under which the first and/or second calibration device is shown in the first camera image
  - including the previously known first field of view,
  - including at least one previously known spatial arrangement, position, orientation and/or spatial extension of the first sensor element relative to the motor vehicle,
  - including at least one previously known spatial arrangement, position, orientation and/or spatial extension of the first and/or second calibration device relative to the motor vehicle, and/or
  - including the second data and/or the additional data;
- the determination of second first data in relation to the second sensor element comprises
  - evaluating the first and/or second calibration devices identified in the second camera image using an evaluation of the perspective under which the first and/or second calibration device is shown in the second camera image,
  - including the previously known second field of view,
  - including at least one previously known spatial arrangement, position, orientation and/or spatial extension of the second sensor element relative to the motor vehicle,
  - including at least one previously known spatial arrangement, position, orientation and/or spatial extension of the first and/or second calibration device relative to the motor vehicle, and/or
  - including the second data and/or the additional data;
- the determination of calibration data for the first sensor element and/or the second sensor element comprises
  - including at least one distance, in particular determined by means of a sensor for determining the distance, between the first and second calibration device,
  - transferring the first first data and the second first data including the second data and/or the additional data into a shared coordinate system of the motor vehicle, of the first sensor element and/or of the second sensor element,
including the previously known first and/or second field of view,
including at least one previously known spatial arrangement, position, orientation and/or spatial extension of the first and/or second sensor element relative to the motor vehicle, and/or
including at least one previously known spatial arrangement, position, orientation and/or spatial extension of the first and/or second calibration device relative to the motor vehicle; and
the determination of calibration data for the first sensor element and/or the second sensor element further provides information regarding at least one distance between the first and second sensor element and/or regarding at least one spatial arrangement, position, orientation and/or spatial extension of the first and/or second calibration device relative to the motor vehicle.

7. The method according to claim 4, wherein at least one of
the first first data comprises
information on the first and/or second calibration devices including a perspective under which the first and/or second calibration device is shown in the first camera image,
information on the first field of view, and/or
information on at least one spatial arrangement, position, orientation and/or spatial extension of the first sensor element in a coordinate system of the first sensor element and/or of the motor vehicle;
the second first data comprises
information on the first and/or second calibration devices including a perspective under which the first and/or second calibration device is shown in the second camera image,
information on the second field of view, and/or
information on at least one spatial arrangement, position, orientation and/or spatial extension of the second sensor element, in particular in a coordinate system of the first sensor element and/or of the motor vehicle; and
the second data is predefined and/or stored, and/or comprises CAD data of at least a part of the motor vehicle, the first calibration device, the second calibration device and/or the motor vehicle with first and/or second calibration devices arranged thereon at predefined positions, and the CAD data comprises the spatial course and/or extension of the chassis, the first and/or second section and/or their boundary, and/or the first and second calibration device.

8. A device for determining calibration data for at least one camera system of a motor vehicle, comprising at least one processor unit which is configured to implement the steps of the method according to claim 4.

9. A motor vehicle, comprising
at least one camera system having at least one first sensor element and at least one second sensor element; and
at least one device according to claim 8 for determining calibration data for the camera system.

10. The motor vehicle according to claim 9, wherein the motor vehicle is formed as a utility vehicle, a truck, a semi-trailer truck, a traction unit and/or a motorized road vehicle.

* * * * *